Patented Apr. 9, 1935

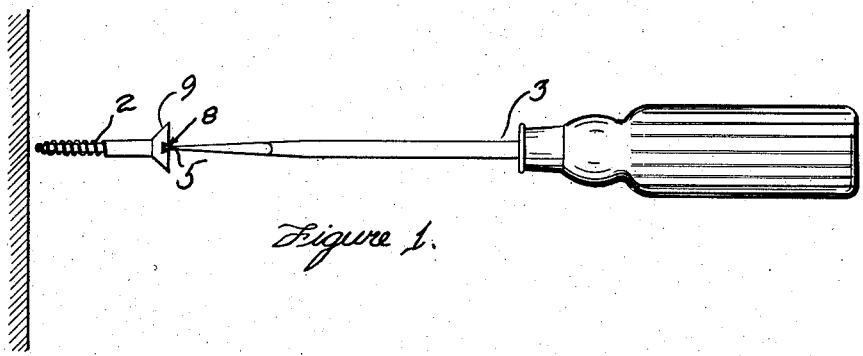
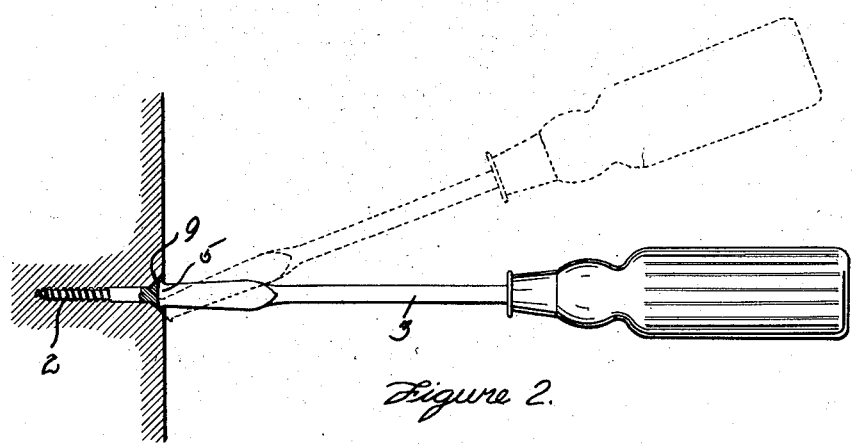
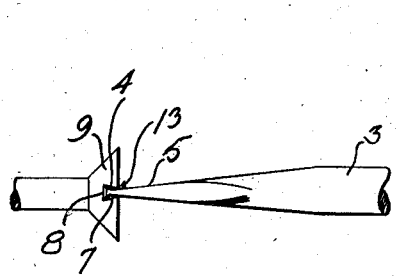
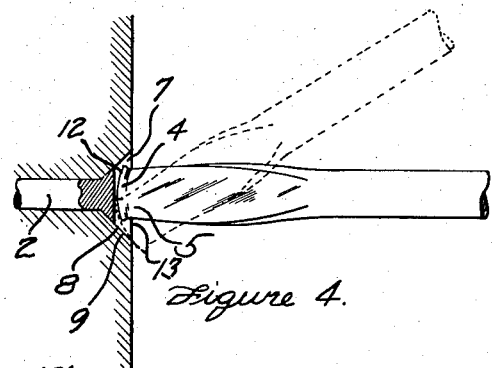
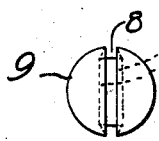
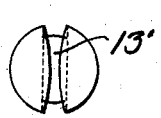

1,997,422

UNITED STATES PATENT OFFICE 1,997,422

SCREW AND DRIVER THEREFOR

Hans Lorenzen, Oakland, and Arnold Leonhard, Piedmont, Calif.

Application January 3, 1933, Serial No. 649,952

2 Claims. (Cl. 85—45)

The invention relates to a means in connection with a screw and driver therefor, which will permit the temporary interlocking of the two for handling and turning.

An object of the invention is to provide a means of the character described which will afford the interlocking feature without requiring the use of any parts other than the screw and driver or necessitating any departure or change in design or construction such as would prevent either the screw or driver from being used with a driver or screw respectively of conventional form.

Another object is to provide a means of the character described which, in addition to insuring a positive interlock of the screw and driver when operatively connected, permits with extreme readiness and facility the placing of the members into engagement or the release of the members from engagement, both before and after the screw has been fully driven home in the work.

A further object is to provide a screw and screw driver of the character described in which the modifications, such as necessarily made over the conventional designs in order to provide the novel interlocking feature, are of a nature avoiding any weakening of the parts or rendering the cost of manufacture of the members excessive.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side view of a screw and driver of my invention, showing them operatively connected as before the screw is inserted into or after being withdrawn from the work.

Figure 2 is a view similar to Figure 1, but showing the screw partially in section and fully embedded in the work.

Figures 3 and 4 are enlarged fragmentary views of the members in the positions illustrated in Figures 1 and 2 respectively.

Figures 5 and 6 are end views of the screw and driver respectively.

Figure 7 is an end view of a modified form of screw.

The essential feature of the cooperating members in the present embodiment of the invention is the provision thereon of means permitting the releasable interlocking of the members together, the arrangement and design being such that the interlocking feature is afforded without entailing a mode of operation of the members very much different from that used with corresponding members of ordinary design. As shown in the drawing, the interlock of the screw 2 and the screw-driver 3 is afforded through cooperation of the portions on such members, arranged for engagement as in the conventional types. In other words the interlock is provided by engagement of the sides 4 of the bit 5 of the driver with the sides 7 of the slot 8 in the head 9 of the screw.

As will be clear, particularly from Figures 3 and 4 of the drawing, the side portions 4 of the bit diverge toward the free end of the driver, and in conformity therewith the side portions 7 of the screw-head slot are correspondingly formed and related from the bottom to the open face of the slot. In this manner, as will be readily understood, on the engagement of the cooperating surfaces of the bit and screw-head, the driver and screw will be effectively locked together against relative outward as well as inward longitudinal displacement.

Placing of the members into operative engagement or releasing same from such engagement may be easily effected, the first being accomplished by inserting the bit edgewise into the slot and moving the screw and driver together transversely so as to align the parts longitudinally, and the second being done by merely sliding the members transversely until complete disengagement is secured. This method of engaging and disengagement of the members, while applicable in a great many instances, is nevertheless inadequate where as shown in the drawing the screw is formed with a head for countersinking, since in the latter case the ends of the slot in the screw become hidden in the work when the screw is driven fully home and thereby prevent the withdrawal of the bit if the members are engaged or prevent the insertion of the bit if the members are separated. Accordingly we have so designed the members that engagement or disengagement may be readily effected even when the ends of the screw slot are closed. As will be understood, the principal advantages of being able to retain the screw secured to the end of the driver are that first, the screw may be carried on the driver to or from its position in the work, and second, the driver may be more effectively prevented from slipping out of the screw slot during the screwing or unscrewing operation. Since in each of the instances aforesaid, the existence of an absolutely unyielding interlock of the members is not required for affording effective results, the construction and design of the parts providing for the interlocking feature, are such that on certain manipulation of the members, said parts may be placed in or removed from operative interlocking engagement by causing the portion of the bit with the greatest thickness to be drawn through the slot's most restricted portion, that is along the open side. One design of the members to permit the aforementioned manipulation is illustrated in the drawing, and embraces, in so far as concerns any departure in the construction of the members as heretofore described, features in the driver member exclusively. As will be clear from Figure 4, the end face 12 of the bit is curved outwardly about a point along the longitudinal axis of the driver as a center, and the angle of divergence of the sides 4 from the vertical is less at the edges than at the middle of the bit, the decrease in the angle aforesaid being accompanied as shown in Figure 6 by a decrease in the thickness of the bit thereat and the extent of such decrease being sufficient to leave the edge portions of the bit thinner than the width of the slot. With the driver designed in this manner and the bit portion at the middle of face 12 thick enough to afford an interlock in the screw slot, but not so thick as to prevent its being forced through the top of the slot on application of suitable pressure, insertion or withdrawal of the bit may be readily effected by slipping the bit—edge first—through the slot at the end of the open face 13. For example, when the screw has been completely driven into the work and it is desired to release the screw-driver, it is merely necessary, as shown in the dotted lines of Figure 4, to tilt the driver so as to place an edge portion of the face of the bit in the open face of the slot and then swing and force the driver so that the remaining portion of the face of the bit will follow through in the manner of the preceding edge portion until the bit becomes completely disengaged. Likewise in effecting the initial engagement of the bit, the driver is held at an angle to the screw so that an edge portion of the face of the bit may enter the open side of the slot, the handle being then swung to move the remainder of the bit-face into the slot and bring the axis of the drive in line with that of the screw.

The angle formed between the sides of the bit and the face thereof is acute, and preferably a greater divergence of the sides occurs as the face is approached. In this manner a sharp edge will be defined at the juncture of the sides and face of the bit which will tend as the driver is rotated in effecting the turning of the screw, to bite into the sides of the screw-head slot and thereby reduce the possibility of the bit slipping transversely as well as longitudinally from out of the slot.

In Figure 7, we have shown the screw modified so that the driver may be moved through the open face 13' of the slot without requiring the bit to be thinned at the edges or to be forced through by pressure. In this embodiment the end portions of the open side of the slot are formed almost as wide as the portion of the slot at the base, thus permitting the bit to readily pass through the slot on manipulation of the driver as explained in connection with the first embodiment.

It will now be clear that by the use of the screw and driver of our invention, the former may be readily carried on the end of the latter preparatory to the screwing operation and thereby considerably facilitating and expediting the positioning of the screw in a desired place regardless of how inaccessible the place may be, and conversely, on completion of the operation of retracting the screw, the latter will be carried on the end of the screw driver and so prevent its being dropped until removed by the operator.

We claim:

1. A screw provided across an end face thereof with a slot divergently tapering from said face inwardly of the screw and from adjacent the center of said face towards the outer sides thereof to define a cavity wedge-shaped in cross section longitudinally of the screw and a widening of the slot from the center of said face to the opposite side edges of the slot, the bottom of the slot being of uniform width throughout its length the width of said slot at said side edges being substantially the same as the extreme width of the base of said cavity, and to be used with a driver having an end portion convergently tapered from the end face thereof and arranged to fit in said cavity, said driver end face being of a width substantially the same as the cavity base and edge slot widths aforesaid and being arcuately convex in the longitudinal plane of the driver to permit removal of said driver face from one of the side edges of the slot upon arcuate displacement of the driver relative to the screw and about substantially the center of curvature of said driver end face.

2. A screw provided across an end face thereof with a slot wedge-shaped in cross section increasing in width longitudinally from the end face and along curved lines from the center of the face to the opposite side edges of the slot, the bottom of the slot being of uniform width throughout its length and to be used with a driver with a bit arranged for interlocking engagement in said slot and having an engaging portion of a width substantially the same as that of the slot at said opposite side edges thereof, the end face of said bit being arcuately convex to permit removal of the bit from the slot upon rotation of the bit relative to the screw about the center of curvature of said bit end face.

HANS LORENZEN.
ARNOLD LEONHARD.